United States Patent
Turner et al.

(10) Patent No.: US 9,791,148 B2
(45) Date of Patent: Oct. 17, 2017

(54) HIGH EFFICIENCY RADIANT HEATER

(75) Inventors: Glyn Wilfred Turner, Brierley Hill (GB); Lee Brian Herbert, Brierley Hill (GB)

(73) Assignee: Reznor LLC, Mercer, PA (US)

( * ) Notice: Subject to any disclaimer, the term of this patent is extended or adjusted under 35 U.S.C. 154(b) by 1476 days.

(21) Appl. No.: 13/345,534

(22) Filed: Jan. 6, 2012

(65) Prior Publication Data

US 2012/0111320 A1     May 10, 2012

Related U.S. Application Data

(63) Continuation of application No. 11/882,880, filed on Aug. 6, 2007, now Pat. No. 8,105,076.

(51) Int. Cl.
| | |
|---|---|
| *F23C 3/00* | (2006.01) |
| *F23D 14/64* | (2006.01) |
| *F23D 14/12* | (2006.01) |
| *F23L 15/04* | (2006.01) |
| *F24D 5/08* | (2006.01) |

(52) U.S. Cl.
CPC ............ *F23D 14/64* (2013.01); *F23C 3/002* (2013.01); *F23D 14/12* (2013.01); *F23L 15/04* (2013.01); *F23D 2900/14181* (2013.01); *F24D 5/08* (2013.01); *Y02E 20/348* (2013.01)

(58) Field of Classification Search
CPC ............ F23D 14/16; F23D 14/14; F23D 2900/14181; F23D 14/12; F23D 14/64; F23C 99/00; F23C 3/002; F23L 15/04; F24D 5/08
USPC ............ 126/92 R, 91 A, 92 B; 431/215, 328
See application file for complete search history.

(56) References Cited

U.S. PATENT DOCUMENTS

| | | | |
|---|---|---|---|
| 3,212,558 A | 10/1965 | Williams | |
| 3,881,858 A * | 5/1975 | Fitzgerald | ............... F23C 99/00 431/348 |

(Continued)

FOREIGN PATENT DOCUMENTS

GB     2395775 A     6/2004

OTHER PUBLICATIONS

MECHANICAL EXPLORER.COM, Ambi-Rad Vision—a new concept in radiant tube heating (admitted prior art).

(Continued)

*Primary Examiner* — Avinash Savani
*Assistant Examiner* — George R Blum
(74) *Attorney, Agent, or Firm* — Schwegman Lundberg & Woessner, P.A.

(57) ABSTRACT

A radiant tube heater with a burner assembly, a radiant tube assembly and a combustion air pre-heater, wherein the burner assembly comprises: a burner fuel nozzle; a plenum chamber and a pre-mixer chamber; the plenum chamber having a combustion air inlet; wherein in use: combustion air flows from said plenum chamber through an orifice to said pre-mixer where said air, is mixed with burner fuel entering said pre-mixer through said nozzle prior to being combusted at a burner head; said pre-mixer being at least partly located within said radiant tube assembly; and where in use at least part of the combustion air supplied to said plenum is preheated in said air pre-heater using residual sensible heat of the hot combustion gas products of the heater.

3 Claims, 7 Drawing Sheets

(56) References Cited

U.S. PATENT DOCUMENTS

| | | | | |
|---|---|---|---|---|
| 4,218,266 | A | * | 8/1980 | Guazzoni ............... H01L 35/00 136/205 |
| 4,310,303 | A | * | 1/1982 | Collier .................... F23L 15/04 126/91 A |
| 4,369,029 | A | * | 1/1983 | Forster .................... F23L 15/04 165/166 |
| 4,479,535 | A | * | 10/1984 | Echigo .................... F23C 3/002 126/91 A |
| 4,483,391 | A | | 11/1984 | Gilbert |
| 4,524,752 | A | * | 6/1985 | Clarke .................... F23C 3/002 126/91 A |
| 4,642,049 | A | * | 2/1987 | Louis ...................... F23L 15/04 122/1 A |
| 4,676,222 | A | * | 6/1987 | Jones ....................... F24D 5/08 126/91 A |
| 4,771,826 | A | * | 9/1988 | Grehier ................ F28D 9/0037 165/166 |
| 5,139,415 | A | * | 8/1992 | Schwank ............... F23D 14/14 126/92 AC |
| 5,154,599 | A | | 10/1992 | Wunning |
| 5,178,210 | A | | 1/1993 | Guillet et al. |
| 5,191,930 | A | * | 3/1993 | Chaney .................. F23L 15/02 165/10 |
| 5,203,690 | A | * | 4/1993 | Maruko .................... F23C 3/00 431/170 |
| 5,291,859 | A | | 3/1994 | Brinck et al. |
| 5,368,472 | A | | 11/1994 | Hovis et al. |
| 5,529,484 | A | * | 6/1996 | Moard .................... F02B 47/02 431/210 |
| 5,626,125 | A | | 5/1997 | Eaves |
| 5,735,680 | A | | 4/1998 | Henkelmann |
| 6,024,083 | A | | 2/2000 | Smirnov |
| 6,027,333 | A | | 2/2000 | Fujii et al. |
| 6,138,662 | A | * | 10/2000 | Jones ....................... F24D 5/08 126/91 A |
| 6,382,958 | B1 | | 5/2002 | Bool et al. |
| 6,484,714 | B1 | * | 11/2002 | Smith ...................... F23H 3/02 126/163 R |
| 6,872,070 | B2 | | 3/2005 | Moore et al. |
| 7,104,787 | B2 | | 9/2006 | Collier |
| 7,328,697 | B2 | | 2/2008 | Turner et al. |
| 8,105,076 | B2 | | 1/2012 | Turner |
| 2002/0100470 | A1 | * | 8/2002 | Wang ...................... F23C 3/002 126/91 R |
| 2006/0266306 | A1 | * | 11/2006 | Le Mer ..................... F24H 1/43 122/250 R |
| 2008/0178860 | A1 | | 7/2008 | Schwank et al. |
| 2009/0042155 | A1 | * | 2/2009 | Turner .................... F23C 3/002 431/328 |
| 2009/0180232 | A1 | * | 7/2009 | Brice ....................... F24D 5/08 361/103 |
| 2011/0079218 | A1 | * | 4/2011 | Wortman ............... A01K 31/19 126/91 A |
| 2014/0011140 | A1 | * | 1/2014 | Schwank ............... F23C 3/002 431/12 |

OTHER PUBLICATIONS

Ambi-Rad energy efficient heating systems, Building Services OPUS (2006).

Stepping up the performance of radiant heating technology, reprint from Jun. 2006 issue of Modern Building Services, Portico Publishing Limited (2006).

"U.S. Appl. No. 11/882,880, Examiner Interview Summary mailed Jul. 21, 2011", 4 pgs.

"U.S. Appl. No. 11/882,880, Final Office Action mailed Aug. 24, 2009", 18 pgs.

"U.S. Appl. No. 11/882,880, Final Office Action mailed Oct. 8, 2010", 7 pgs.

"U.S. Appl. No. 11/882,880, Non Final Office Action mailed Jan. 23, 2009", 11 pgs.

"U.S. Appl. No. 11/882,880, Non Final Office Action mailed Mar. 1, 2010", 28 pgs.

"U.S. Appl. No. 11/882,880, Non Final Office Action mailed Mar. 25, 2011", 19 pgs.

"U.S. Appl. No. 11/882,880, Notice of Allowance mailed Sep. 30, 2011", 5 pgs.

"U.S. Appl. No. 11/882,880, Response filed Jan. 10, 2011 to Final Office Action mailed Oct. 8, 2010", 9 pgs.

"U.S. Appl. No. 11/882,880, Response filed Apr. 23, 2009 to Non Final Office Action mailed Jan. 23, 2009", 10 pgs.

"U.S. Appl. No. 11/882,880, Response filed Jul. 1, 2010 to Non Final Office Action mailed Mar. 1, 2010", 17 pgs.

"U.S. Appl. No. 11/882,880, Response filed Jul. 25, 2011 to Non Final Office Action mailed Mar. 25, 2011", 12 pgs.

"U.S. Appl. No. 11/882,880, Response filed Dec. 24, 2009 to Final Office Action mailed Aug. 24, 2009", 16 pgs.

"U.S. Appl. No. 11/882,880, Supplemental Amendment filed Jan. 13, 2010", 3 pgs.

* cited by examiner

HIGH EFFICIENCY RADIANT HEATER

BACKGROUND OF INVENTION

1. Field of the Invention

This invention relates to a gas fired radiant tube heater with a high radiant heat efficiency.

2. Description of the Related Art

Gas fired radiant tube heaters are widely used especially to heat industrial and commercial premises. When so used it is desirable that such heaters have a high radiant heat efficiency; that is that a high proportion of the potential energy of the fuel gas is converted to radiant heat, rather than, for example, convective heat. This makes the heater more suitable for location in an elevated position allowing useful heat to be radiated downwardly (often toward occupants of the premises). However, it has generally been found that high radiant efficiency heaters can only be obtained at the expense of a reduced overall thermal efficiency.

BRIEF SUMMARY OF INVENTION

It is an object of the present invention to provide a radiant tube heater having a higher than normal radiant efficiency while at the same time having a good overall thermal efficiency. It is also an aim of the present invention to provide a more compact heater.

In one aspect the invention comprises a radiant tube heater with a burner assembly, a radiant tube assembly and a combustion air pre-heater; wherein the burner assembly comprises: a burner fuel nozzle; a plenum chamber and a pre-mixer chamber; the plenum chamber having a combustion air inlet; wherein in use: combustion air flows from said plenum chamber through an orifice to said pre-mixer where said air is mixed with burner fuel entering said pre-mixer through said nozzle prior to being combusted at a burner head; said pre-mixer being at least partly located within said radiant tube assembly; and where in use at least part of the combustion air supplied to said plenum is preheated in said air pre-heater using residual sensible heat of the hot combustion gas products of the heater.

Preferably, the burner fuel nozzle comprises an axial outlet and a plurality of radial outlets. This advantageously helps promote good mixing of air and fuel in the pre-mixer.

Preferably the radiant tube heater further comprises a secondary air channel that surrounds said pre-mixer and is in fluid communication with said plenum chamber such that in use air from said plenum enters said secondary air channel and thereby supplies secondary air for further combustion of products leaving said burner head. Preferably, this secondary air channel is located within the entry portion of the radiant tube assembly. This advantageously allows a relatively long pre-mixer tube to be used while maintaining a compact sized heater and also simplifies the design of the plenum chamber. Preferably the burner head extends over the exit portion of said secondary air channel.

The air pre-heater may comprise one or more cross-flow type heat exchanger blocks. Preferably, in use, combustion air is preheated by passing in a first direction through at least part of a heat exchanger block and in a second direction through a further heat exchanger. More preferably, in use during preheating the combustion air makes a U-turn such that said first direction is in an opposite direction to said second direction, or the combustion air makes a 90° turn. This advantageously allows the heat exchanger unit to be located close to the burner assembly. During preheating the combustion air may make a U-turn such that said first direction is in an opposite direction to said second direction. Changing gas flow direction in the above way advantageously allows a more compact radiant tube heater.

Preferably, the first heat exchanger block and the second heat exchanger block are, at least in part, side-by-side. This advantageously allows a more compact radiant tube heater. Preferably, the radiant tube assembly is U-shaped and preferably comprises two straight tubular portions connected by a semi circular tubular portion. This provides a more compact heater unit.

The combustion gas leaving the radiant tube assembly may enter the air pre-heater in a first direction and may leave the air pre-heater in a second direction, wherein said second direction is generally orthogonal to said first direction.

Preferably, the radiant tube assembly has a reflector unit and insulation means is provided on at least part of said reflector unit. The insulation means may comprise an insulating panel wherein the reflector is located between said insulating panel and said radiant tube assembly such that an air gap separates at least a major part of said reflector unit from said insulating panel. Alternatively, the insulation means may comprise an insulating panel and wherein the reflector is located between said insulating panel and said radiant tube assembly such that a layer of refractory insulation separates at least a major part of said reflector unit from said insulating panel. This advantageously increases the efficiency of the radiant tube assembly in radiating heat energy.

The radiant tube assembly may have a reflector unit and an over-shield wherein the over-shield is located between said reflector and said radiant tube assembly. This advantageously increases the efficiency of the radiant tube assembly in radiating heat energy In another aspect the invention comprises a radiant tube heater having a burner assembly, a radiant tube assembly and a heat exchanger assembly, said heat exchanger assembly comprising two or more cross-flow type heat exchanger blocks; wherein in use residual sensible heat in the combustion products of said burner assembly is used to preheat combustion air supplied to said burner assembly, by passing said combustion air in a first direction through a first heat exchanger block and then in a second direction through a second heat exchanger block. This allows the heater to be more compact.

BRIEF DESCRIPTION OF DRAWINGS

A preferred embodiment of the invention will now be described by reference to the following diagrammatic figures in which.

DETAILED DESCRIPTION OF THE INVENTION

A preferred embodiment of the invention will now be described by reference to FIGS. 1-6.

Figure 1:
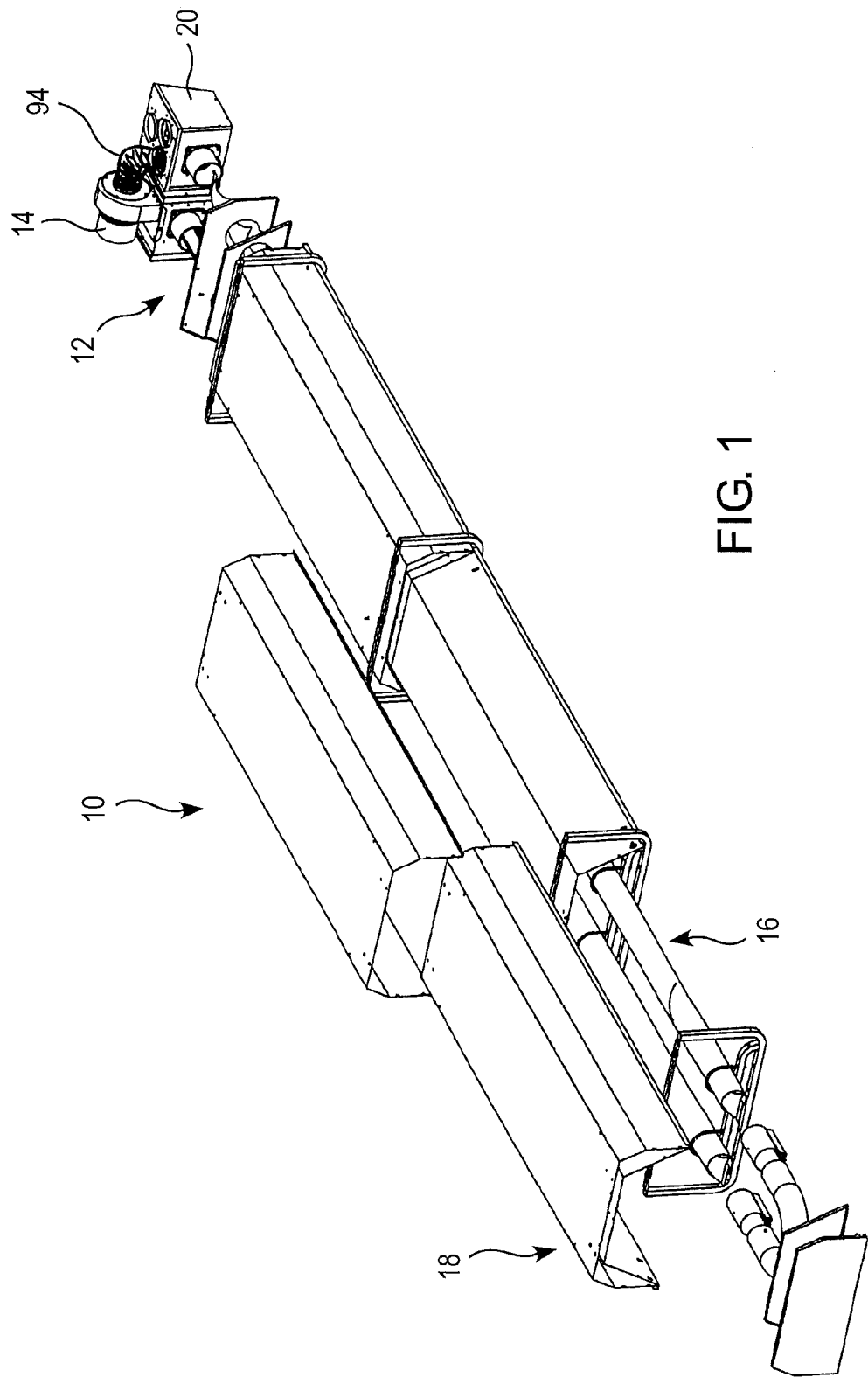
FIG. 1 shows an overall (partly exploded) perspective view of a heater according to preferred embodiment of the invention.

FIG. 1 shows a radiant tube heater 10 comprising; a fuel burner assembly 12; a combustion air fan 14; a radiant tube assembly 16; a reflector/insulator unit 18; and an air preheater heat exchanger 20. In use, fuel (typically natural gas) is combusted with preheated air (slightly compressed by passing through fan 14) in burner assembly 12. Hot combustion gases from the burner 12 pass into and through the U-shaped radiant tube assembly 16 before entering heat exchanger 20 where residual sensible heat in the hot combustion products is used to preheat combustion air fed to burner assembly 12 (via fan 14); typically to a temperature of between 100 and 120° C. Above and around the sides of the radiant tube assembly 16 there is located a reflector unit. The purpose of the reflector unit is to reflect radiant heat energy downwardly (that is away from the reflector) such that in use the maximum amount of radiant energy is directed in a downward direction towards the floor of the space being heated.

Figure 2:
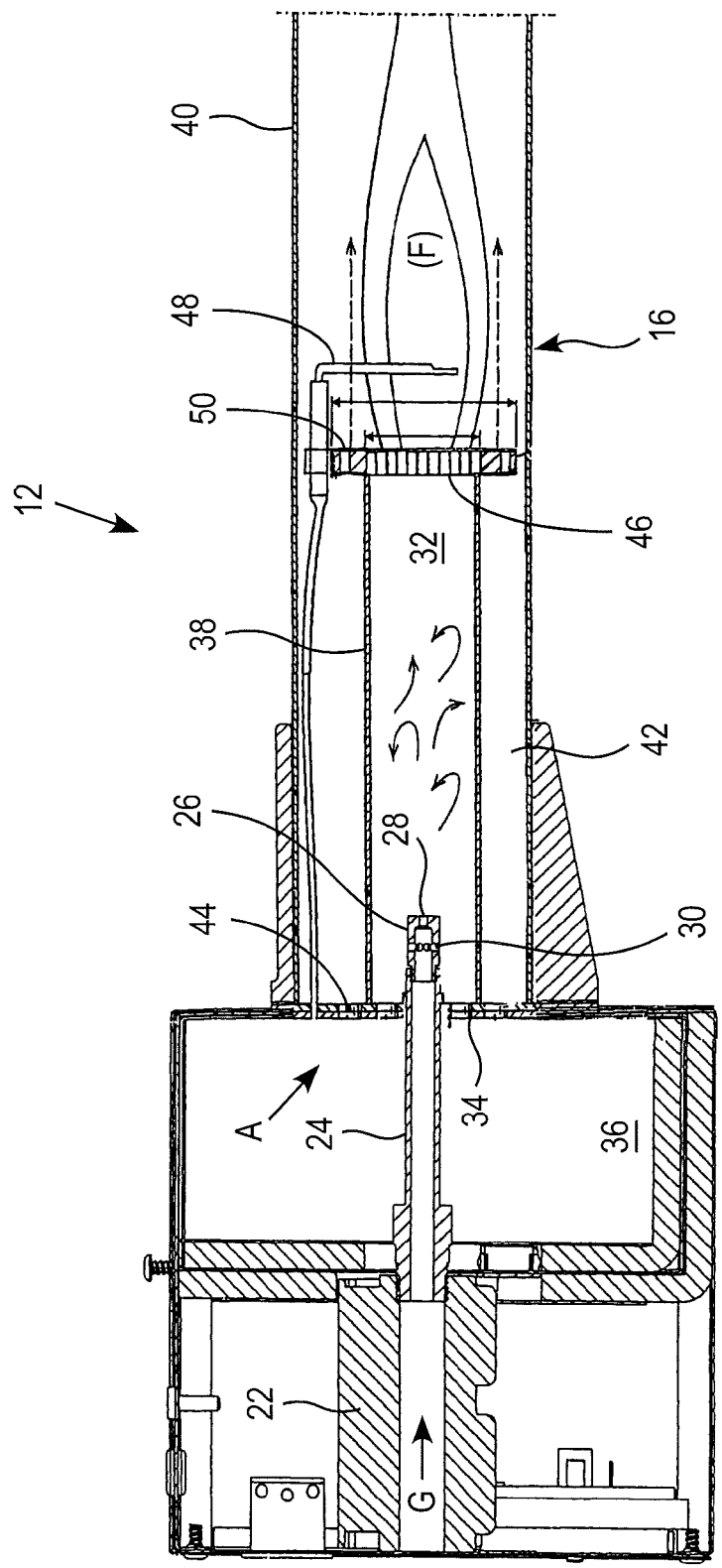
FIG. 2 shows a side elevation of burner assembly of the heater of FIG. 1.

FIG. 2 shows a side elevation (cross section) of the burner assembly 12 and also the entry portion of the radiant tube assembly 16. Gaseous fuel (G) enters a control valve 22 where the fuel flow-rate is regulated and passes from the exit of valve 22 into a straight nozzle feed pipe 24 and thence to burner nozzle 26. Burner nozzle 26 comprises at least one axial outlet orifice 28 and a plurality of radially directing orifices 30. The burner nozzle 26 ejects fuel into a pre-mixer 32 where the fuel is premixed with combustion air (A). The axial and radial orifices 28 and 30 help promote turbulence in the pre-mixer and generally promote good mixing of air and fuel prior to combustion. This advantageously encourages a long flame and results in a more consistent flame quality. Combustion air enters the pre-mixer 32 through one or more orifices 34. Air feed to the burner is drawn through combustion air pre-heater 20 (as a result of suction fan 14) where it is preheated prior to entering plenum chamber 36 located between control valve 22 and burner nozzle 26 and surrounding feed pipe 24. Thus, gaseous fuel flowing through pipe 24 is preheated owing to the higher temperature of the pre-heated air flowing through plenum chamber 36. Primary air orifices 34 are located in a wall that otherwise separates the plenum chamber 36 and the premixer 32. Pre-mixer 32 comprises a cylindrical tube 38 and is preferably formed by extruding aluminium or an alloy thereof. Pre-mixer 32 is located within the radiant tube assembly 16 such that an annular channel 42 is formed along which pre-heated air from plenum chamber 36 may flow via one or more secondary air orifices 44. This simplifies the design of the plenum chamber 36. The downstream end of the pre-mixer tube 38 terminates at a burner head 46 that may comprise an array of circular or rectangular orifices. Burner head 46 extends radially outwardly beyond premixer 32 so that an annular portion, containing a ring of circumferentially spaced apertures 50, partly seals the downstream end of annular channel 42. Burner head 46 ensures that the base of flame (F) is retained on the exit surface of burner head 46. Pre-heated secondary air enters the flame F by flowing along annular channel 42 and through apertures 50. This advantageously, assists mixing of secondary air with the products of combustion the secondary air enters flame F. Ignition means 48 (for example spark ignition) is provided to allow initial lighting of the burner.

Figure 3:
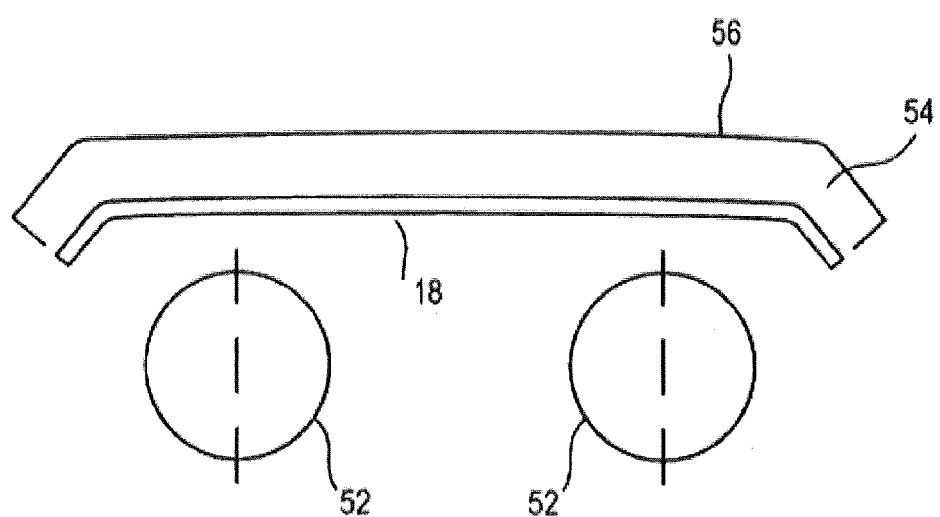
FIG. 3 shows a side cross section of the radiant tubes and the reflector assembly of the heater of FIG. 1.

FIG. 3 shows further details of the reflector unit 18, located above the tubes 52 of the radiant tube assembly 16. The reflector unit is located some way above the radiant heater tubes and extends part away around the outer side of each tube, the order to maximise the extent of downward reflection of radiant heat energy. The invention provides insulation means 54, located at least in part proximal to reflector unit 18. This insulation means 54 may comprise a layer of refractory material or the like or alternatively may be provided by other insulating material such as a substantially enclosed air pocket. The latter may be provided by placing an insulating panel 56 above and close to reflector unit 18. This is most effective if the layer of enclosed air (air pocket) is relatively thin.

Figure 4:
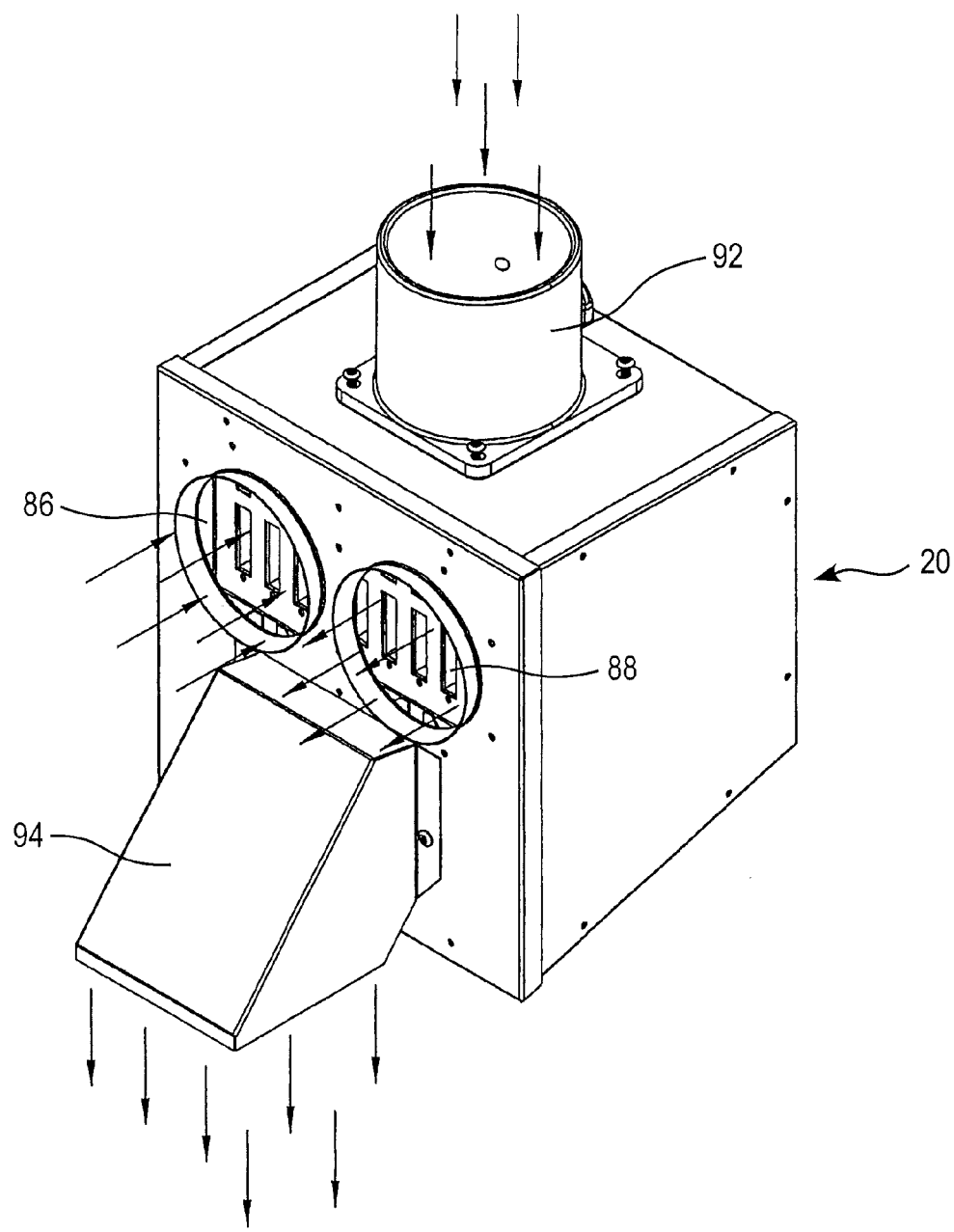
FIG. 4 shows a perspective view of the heat exchanger assembly of the heater of FIG. 1.
Figure 5:
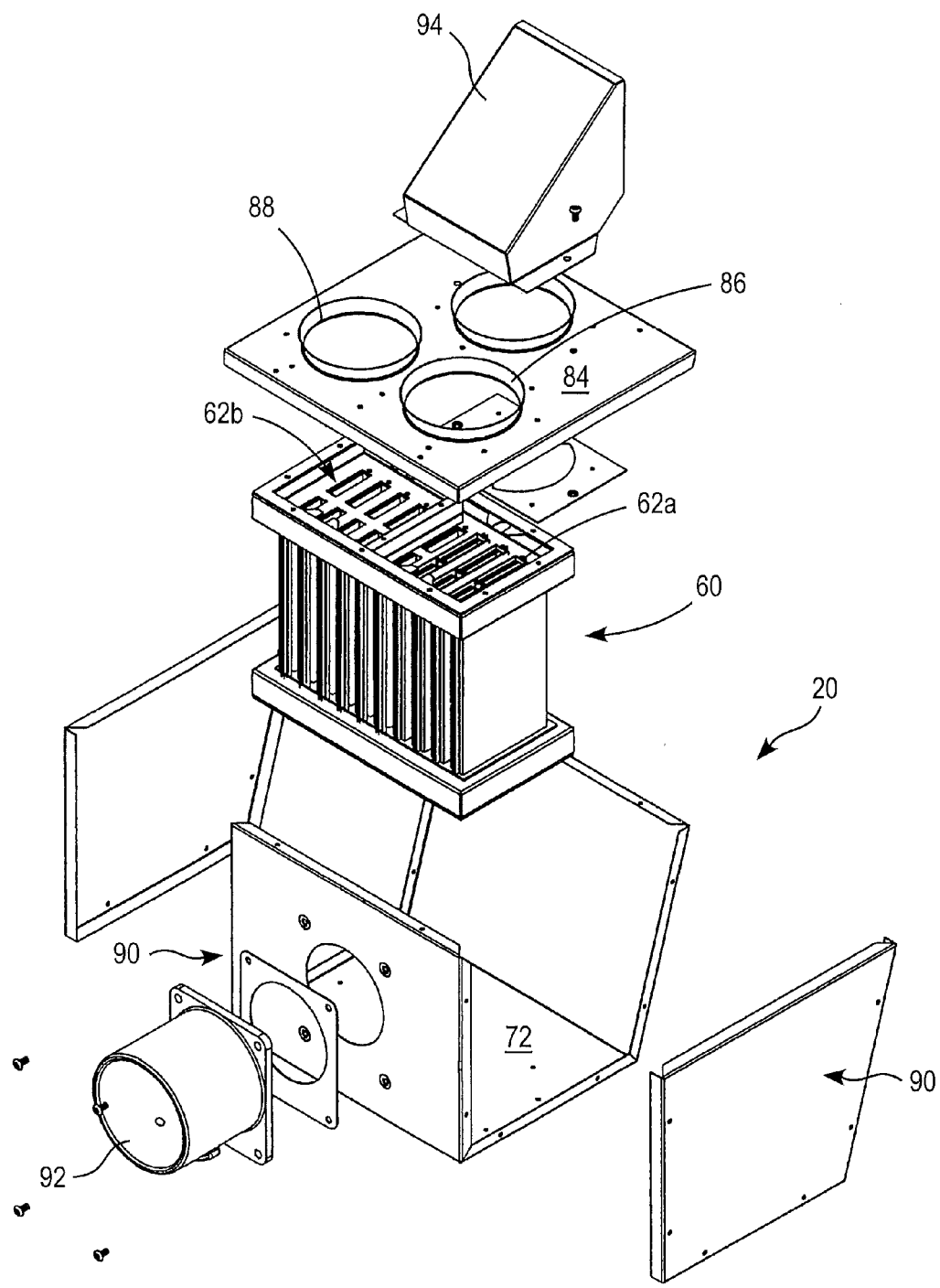
FIG. 5 shows a perspective view of FIG. 4 in exploded form.
Figure 6:
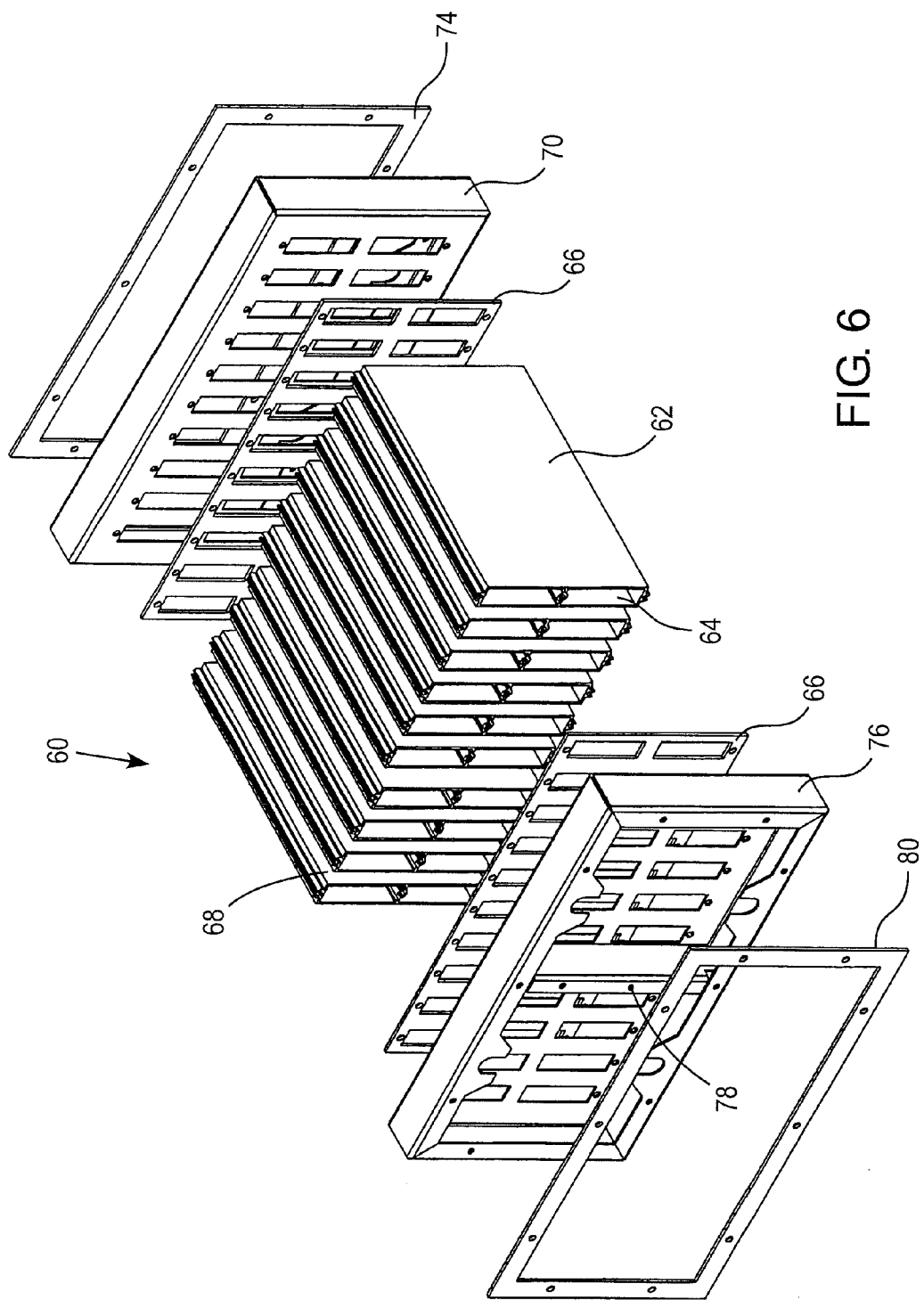
FIG. 6 shows the heat exchanger block of the heat exchanger at assembly of FIG. 4.

FIGS. 4-6 shows details of a heat exchanger unit 20. Referring to FIG. 5 the combustion air pre-heater exchanger 20 comprises a heat exchanger block 60 which is shown in more detail in FIG. 6. Heat exchanger block 60 is formed from an array of heat exchanger ducts 62 arranged side-by-side and providing an internal flow channel 64 through which combustion air flows during preheating. The array of heat exchanger ducts 62 are held in place by end plates members 66. In use, hot combustion products pass (preferably in a direction orthogonal to preheat air flow) through the channels 68 located between individual exchanger ducts 62. Assembly member 70 provides a space for the preheated air to turn after passing through a first array of ducts (62a) before flowing in an opposite direction through a second array of ducts (62b). Assembly member 70 is sealed to the lower panel 72 (see FIG. 5) of the heat exchanger unit housing by means of a gasket 74. A separation assembly 76 similar to assembly member 70 but having an additional central member 78 in combination with gasket 80 provides a seal with the upper portion 84 (see FIG. 5) of the heat exchanger unit and ensures that air entering the exchanger through inlet flange 86 must flow through the first array of tubes 62a and cannot bypass the exchanger.

The heat exchanger block is located within housing 90 which takes the form of a box having a hot combustion products inlet duct 92, a cooled combustion products outlet duct 94, a combustion air inlet duct 86, and a preheated air outlet duct 88.

FIG. 5 shows the position of combustion air inlet duct 86 and preheated air outlet duct 88 relative to the heat exchanger block 60. In this example, the heat exchanger block 60 comprises (see FIG. 6) 10 ducts 62 that in use function as two separate blocks (62a and 62b) of 5 ducts. Thus, when assembled heat air pre-heater exchanger unit 20 directs combustion air through inlet duct 86 which then passes through internal flow channels of the first 5 ducts 62a. The partly preheated air then makes a U-turn and passes (in the opposite direction) through the remaining 5 ducts 62b and thence to preheated air outlet duct 88 and thence through a duct 94 to the inlet of air fan 14 (see FIG. 1). Further, in use combustion products pass horizontally through spaces of 68 (located between individual exchanger ducts 62) thereby providing the energy required to preheat the combustion air. In consequence, during passage of combustion products in said horizontal direction sensible heat is lost resulting in further cooling of the combustion products. Thus, heat exchanger block 60 in combination with the heat exchanger housing 90 provide a cross flow heat exchanger in which combustion air is partly preheated in a first portion of the exchanger block 62a, then makes a U-turn and is further preheated as he passes in an opposite direction through a second portion of the exchanger block 62b.

Naturally, the exchanger block 60 can comprise a wide range of individual exchanger ducts 62 and is not limited to a 5 plus 5 duct arrangement. Indeed, it is possible to have exchanger blocks 60 were the first portion of the exchanger block has more or less ducts and the second portion of the exchanger block. Preferably, the first portion will have either a slightly more ducts or an equal number of ducts than the second portion.

Figure 7:
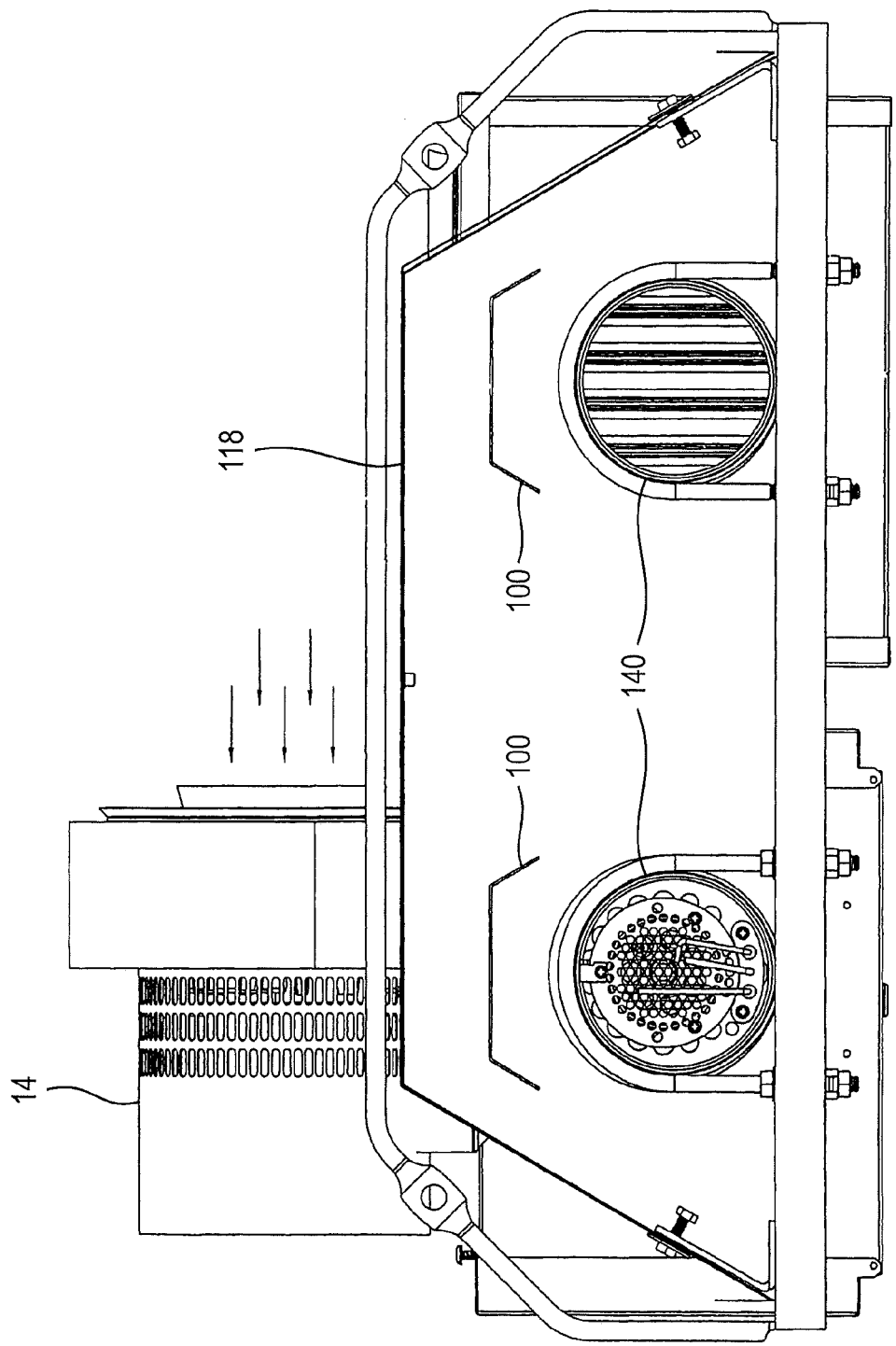
FIG. 7 shows a second embodiment of the invention with an over-shield.

FIG. 7 shows a further embodiment of the invention similar to the embodiment described above in most respects apart from the reflector 118, which in this embodiment is not insulated. Also. located between the reflector and the radiant tube assembly 140 there are over-shields 100. Over-shields 100 are preferably located slightly above each tube of a U-shaped radiant tube assembly 140. The over-shields reduce the amount of radiant energy that is incident upon the reflector 118 located above. This results in an improved (useful) radiant energy efficiency as energy losses associated with heating the reflector are reduced (this energy ultimately being dissipated largely as convective heat loss).

We claim:

1. A radiant tube heater comprising a burner assembly, a radiant tube assembly and a combustion air pre-heater;
  wherein in use at least part of the combustion air supplied to the heater is preheated in said air pre-heater using the residual sensible heat of hot combustion gas produced by the heater; and wherein the air pre-heater comprises:
  a heat exchanger block having a first and second array of ducts arranged side by side, such that each array is contacted with hot combustion gas products at the same temperature, and held in place by end plate members;
  said heat exchanger block being arranged so that combustion air is preheated by passing inside and through the first array of ducts before turning and being further preheated by flowing in an opposite direction inside and through the second array of ducts; and
  where hot combustion gas products are cooled by passing in cross flow through a single enclosure, located between said end plate members.

2. A radiant tube heater assembly according to claim 1 said heat exchanger block being arranged so that combustion air to be preheated passes in a first direction inside and through the first array of ducts before turning through an angle of 90°; during which the air flows in a plane or direction orthogonal to the direction of flow of said hot combustion gas products and then turning a further 90°; to flow in a second direction inside and through the second array of ducts; and where said second direction is opposite to said first direction.

3. A radiant tube heater assembly according to claim 2 the radiant tube heater further comprising:
  a single reflector unit located above both said straight tubes; and
  a panel of similar shape and size to said reflector unit located immediately above and close to said reflector unit such that in combination with said reflector unit it substantially encloses an insulating air pocket; said air pocket being characterized by the relatively thin layer of air located between said reflector and said panel.

* * * * *